United States Patent [19]

Barnett et al.

[11] 4,372,419

[45] Feb. 8, 1983

[54] VEHICULAR ANTI-THEFT LOCKING SYSTEM

[76] Inventors: Lawrence Barnett, 75-34 168 St., Flushing, N.Y. 11366; Julio Cordoba, 21 Crosby Ave., Brooklyn, N.Y. 11207; Benjamin Nuzzo, 142 Fountain Ave., Selden, N.Y. 11784

[21] Appl. No.: 122,028

[22] Filed: Feb. 19, 1980

[51] Int. Cl.[3] .................................... B60R 25/00

[52] U.S. Cl. .................................... 180/289; 70/279; 292/144; 292/144

[58] Field of Search .................. 180/289; 70/237-241, 70/279

[56] References Cited

U.S. PATENT DOCUMENTS

| | | | |
|---|---|---|---|
| 450,068 | 4/1891 | Grefen | 70/279 |
| 1,856,391 | 5/1932 | Keppler | 200/42 R |
| 2,045,186 | 6/1936 | Honsel | 70/279 |
| 3,166,144 | 1/1965 | Price | 180/271 X |
| 3,241,344 | 3/1976 | Peters | 70/279 |
| 4,127,018 | 11/1978 | Brand | 180/289 |

FOREIGN PATENT DOCUMENTS

| | | | |
|---|---|---|---|
| 2708393 | 8/1978 | Fed. Rep. of Germany | 70/241 |

*Primary Examiner*—Robert J. Spar

*Assistant Examiner*—Donald W. Underwood

[57] ABSTRACT

Our invention describes a device adapted to provide a vehicle with two or more doors, with an Anti-theft Locking System that will prevent the unauthorized opening of one or more of the doors even if the original equipment locks are open, or forcibly opened. An electro-magnet with dual polarities, mounted inside the door panel, facing toward the post, having an actuator shaft, that, when activated by the flow of current, will engage a receptacle within the post, thereby locking the door permanently until deactivated. A key switch, mounted on the outside of the vehicle body, preferably in an unobvious place, two contact points, and a neutral point for key disengagement, using the vehicle battery as a source of power, will provide current to move the shaft of the electro-magnet into or out of the receptacle; thereby activating or deactivating the system.

2 Claims, 7 Drawing Figures

VEHICULAR ANTI-THEFT LOCKING SYSTEM

BACKGROUND

Due to the failure of present manufacturers' locks from preventing tampering and forced entry, it is necessary to provide an independent Anti-theft Locking System, economical to manufacture, simple to install, and easily adaptable to any vehicle, that will prevent these incidents. Any previous inventions have failed to provide an economical and practical means to prevent forced entry into the vehicle. They required either a complete reworking of the vehicle door or post, or required extensive use of mechanical moving parts that would require maintenance.

Our invention reduces these problems by providing a minimum of moving parts and an easy installation.

DRAWINGS

DESCRIPTION OF THE PREFERRED EMBODIMENT

Figure 1:
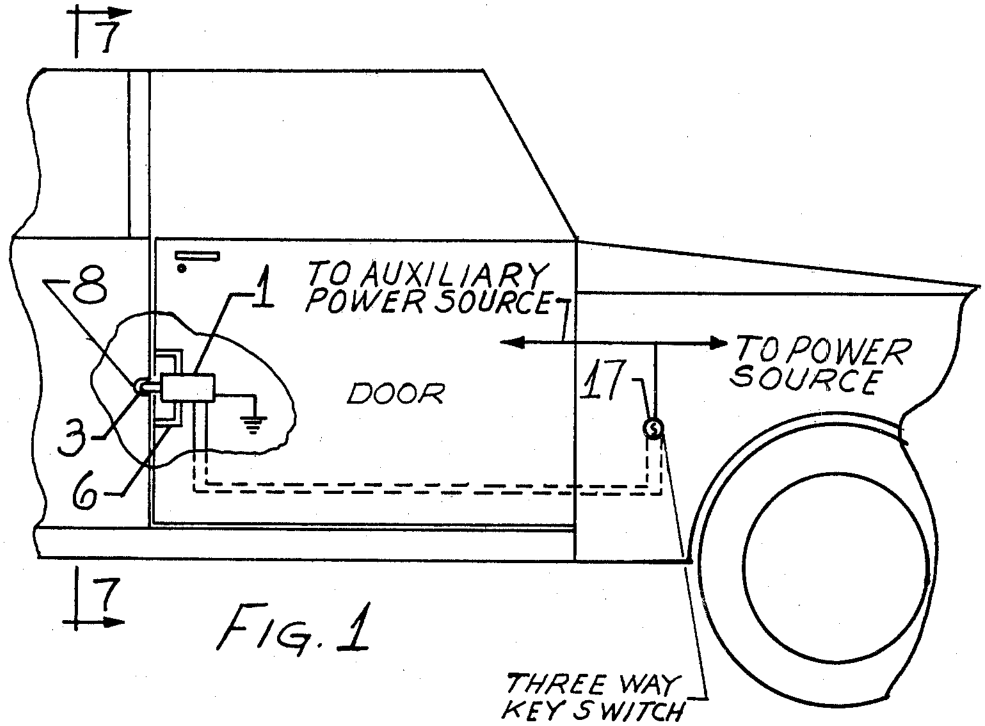
FIG. 1 shows a section view of a vehicle, indicating the best location of the anti-theft device. Note that this location is typical at all doors for two or four door vehicles.
Figure 2:
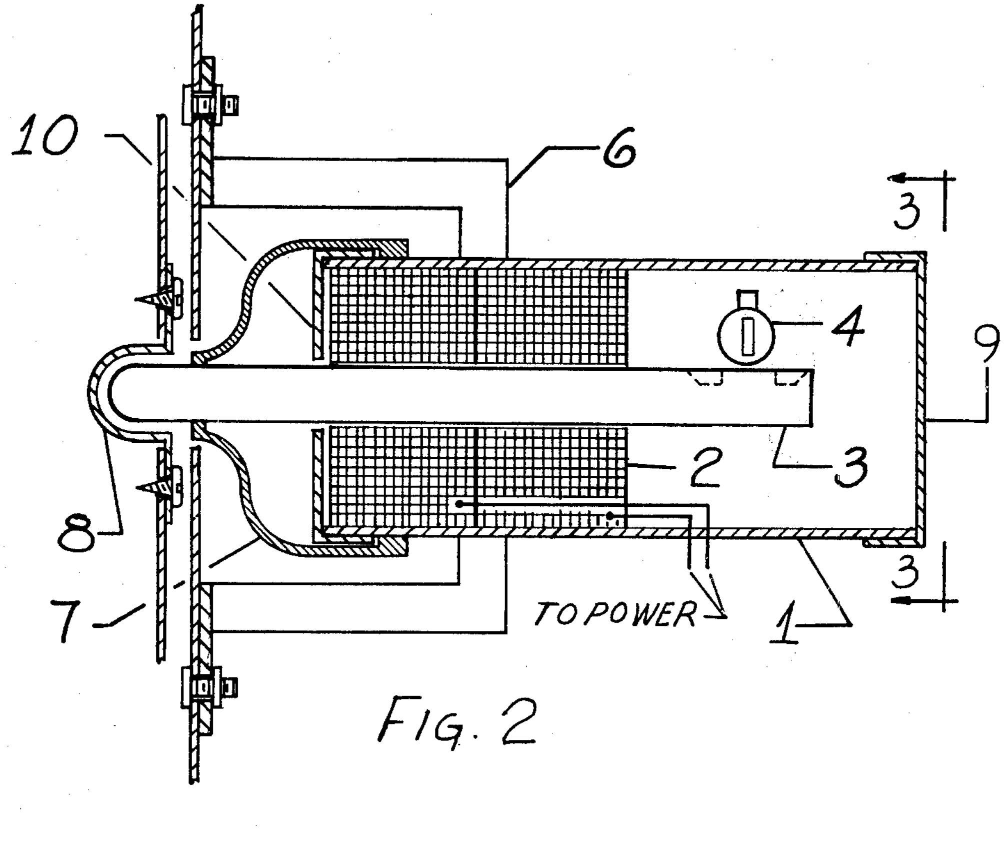
FIG. 2 is a full section view of one actuator. The view shows the locking bolt, magnetic coil, and body casement.

Referring to the drawings in detail, numeral 1, as shown in FIG. 2, designates a metal or plastic-like casing with removable rear casing cap 9, and removable front casing cap 10. An insulated bushing 7, preferably rubber, is attached to the outside of casing 1, and cap 10, to prevent the free movement of locking bolt 3. A magnetic coil 2, located inside casing 1, with locking bolt 3, located in the center of coil 2, and passing through a hole in cap 10, and bushing 7, engages and disengages in receptacle 8, located in the door post.

Figure 3:
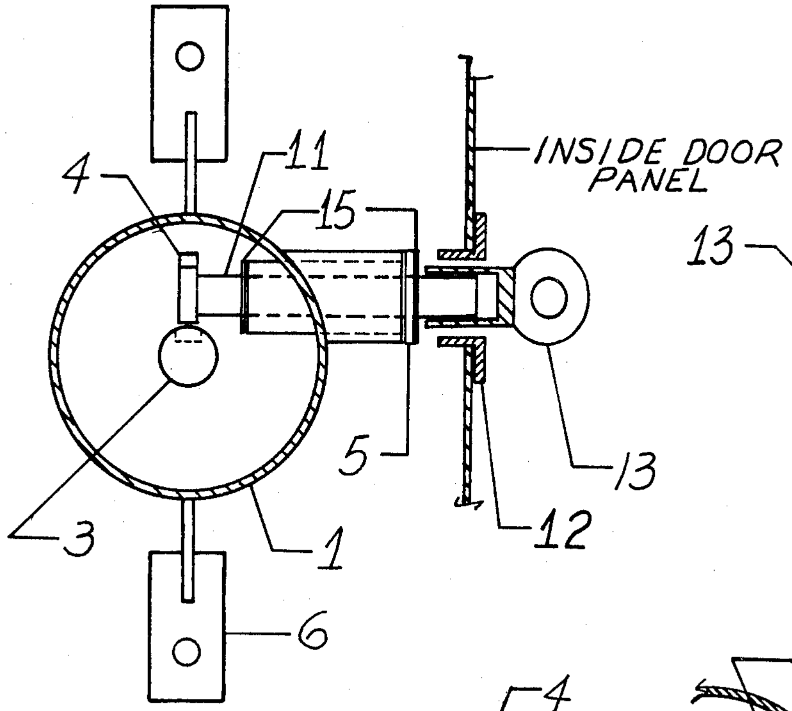
FIG. 3 shows the manual disengaging method, which may be used in case the actuator fails to operate properly and locking bolt remains in door receptacle.
Figure 7:
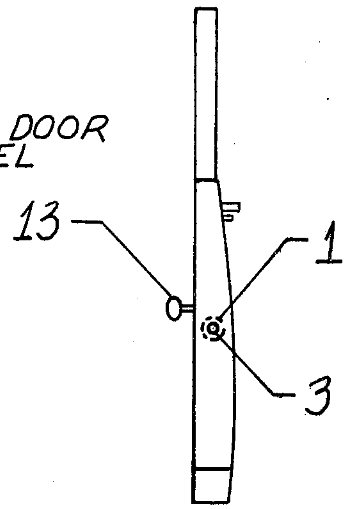
FIG. 7 is a side view of the door, window, and door post shown in FIG. 1.
Figure 5:
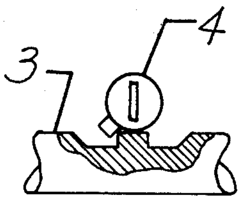
FIG. 5 shows the gear bolt engagement.
Figure 4:
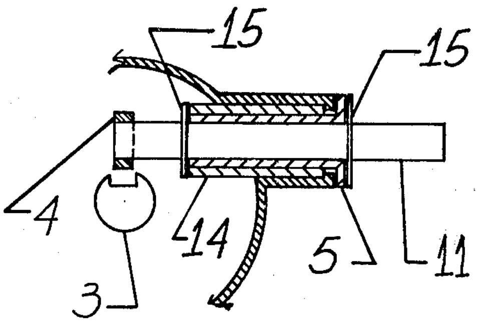
FIG. 4 is a detailed view of the manual disengaging shaft and mounting.

The rear of locking bolt 3, has notches made, and spaced as to allow engaging with gear 4, which is a one tooth gear. This is demonstrated in FIG. 5. Gear shaft 11, shown in FIGS. 3 and 4, is axially attached to gear 4, and protrudes through a plastic-like retainer 5, and bushing 14, located on the outside of casing 1, and extends into the door panel grommet 12.

A rigid securing bracket 6, as shown in FIG. 2, is attached to casing 1, and is used to mount the assembly in place inside the door of the vehicle.

Retainer 5, which holds gear shaft 11, rigidly in place, is free to rotate inside bushing 14, which is securely attached to casing 1. The entire assembly of items 1, 5, 11, and 14 are prevented from moving laterally by locking washers 15, located as shown in FIGS. 3 and 4. Key 13, will fit over gear shaft 11, and when turned, will cause gear 4, to intermesh with locking bolt 3, causing manual disengagement or engagement.

Figure 6:
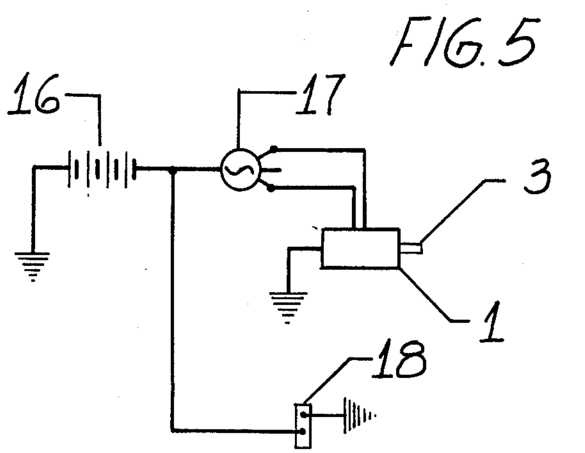
FIG. 6 shows the electric wiring diagram for operation of the system, including the three way switch, and the auxiliary wires located preferably in the trunk of the vehicle.

Turning to FIG. 6, inserting a key into three way switch 17, and turning to the left or to the right, will causing current to flow from vehicle battery 16, to the magnetic coil 2, thus causing the locking bolt to either go into or out of receptacle 8.

In the event that the battery 16, should become discharged due to any cause, it is possible to connect another battery to the auxiliary wires 18, located in the trunk or any other available part of the vehicle.

We claim:

1. A notched locking bolt within a casing cylinder mounted in a vehicle door and a manual disengaging apparatus, said locking bolt passing through a dual polarity electromagnetic coil, through a front casing cap and insulated bushing, through a hole in said vehicle door side wall, and into a receptacle that covers a hole in a door post of said vehicle;

said casing cylinder having removable front and rear casing caps;

said insulated bushing, which is attached to the outside of said casing cylinder and said front casing cap, prevents the free movement of said locking bolt;

said manual disengaging apparatus, accessible from the passenger compartment of said vehicle by means of a gear shaft that is axially attached to a one tooth gear inside said casing cylinder;

said one tooth gear engages with the notches in said locking bolt;

said gear shaft is held in place by and protrudes through a retainer, and a bushing that is securely attached to the outside of said casing cylinder, and through a door panel grommet before engagement with a key;

said key, when turned, will cause said gear shaft to turn said one tooth gear into said notched locking bolt, causing disengagement of said locking bolt from said receptacle;

turning said one tooth gear in opposite direction will cause engagement of said locking bolt into said receptacle;

said retainer is free to rotate inside said bushing;

locking washers prevent said retainer, said gear shaft, and said bushing from moving laterally within said casing cylinder.

2. The combination of claim 1, connected to a three way switch with a neutral point, and two (2) contact points;

turning a key to one of said contact points within said three way switch will complete the circuit to one part of said dual polarity electromagnetic coil, causing said locking bolt to engage in said receptacle;

turning to said neutral point of said three way switch will stop the flow of current, and said locking bolt will be held firmly in place by said insulated bushing, while said locking bolt is engaging said receptacle;

turning said key to the other of said contact points within said three way switch will complete the circuit to the other part of said dual polarity electromagnetic coil, causing said locking bolt to disengage with said receptacle;

turning to said neutral point of said three way switch will stop the flow of current, and said locking bolt will be held firmly in place by said insulated bushing, while said locking bolt is disengaged from said receptacle.

* * * * *